(No Model.)
L. FEELY.
RECEPTACLE FOR CARRYING BEER.
No. 338,053. Patented Mar. 16, 1886.
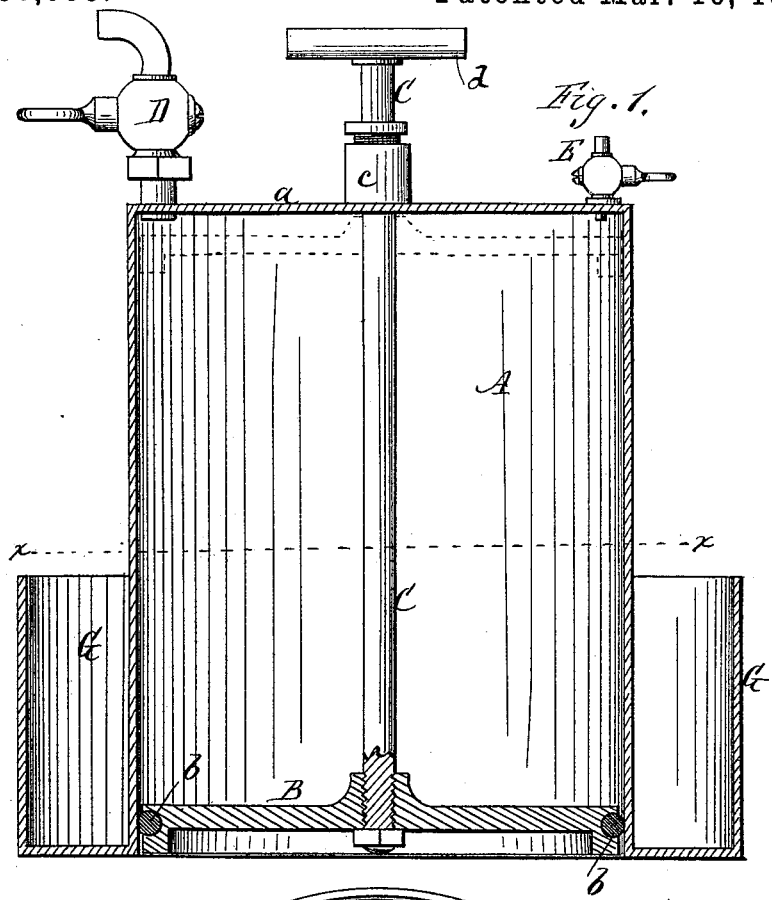
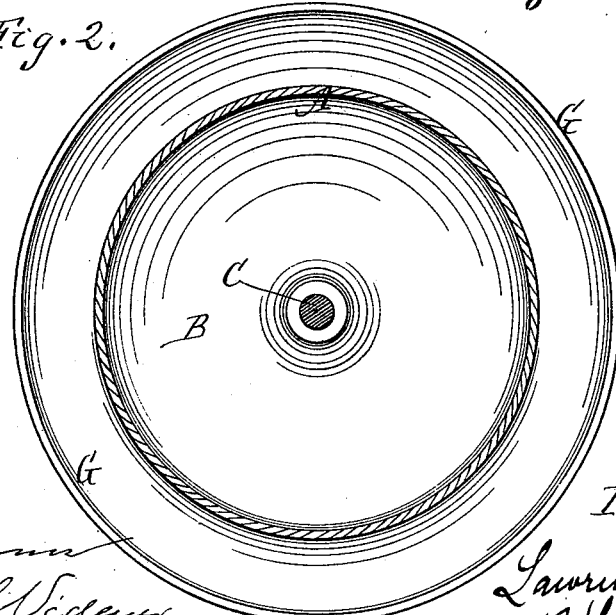
Attest.
E. A. Adams
Chas. O. Videan
Inventor.
Lawrence Feely,
R. F. Osgood,
Atty

United States Patent Office.

LAWRENCE FEELY, OF ROCHESTER, NEW YORK, ASSIGNOR OF ONE-HALF TO WALTER B. DUFFY, OF SAME PLACE.

RECEPTACLE FOR CARRYING BEER.

SPECIFICATION forming part of Letters Patent No. 338,053, dated March 16, 1886.

Application filed December 3, 1885. Serial No. 184,650. (No model.)

*To all whom it may concern:*

Be it known that I, LAWRENCE FEELY, of the city of Rochester, in the county of Monroe and State of New York, have invented a certain new and useful Improvement in Receptacles for Carrying Beer; and I do hereby declare that the following is a full, clear, and exact description of the same, reference being had to the drawings accompanying this application.

My improvement relates to a receptacle in which beer and other liquids, in small quantities, can be carried from one point to another without becoming stale and flat, and can at the same time be kept cool.

It is customary to draw beer into a pitcher or other open vessel and carry it to the point where it is to be used, exposed to the air during the passage, by which means it loses its gas and becomes insipid and lifeless.

My invention consists of an air-tight vessel provided with a plunger that forms the bottom, which when forced down exhausts the air and allows the entrance of the liquid to fill the vacuum, and when drawn up again discharges the liquid, all as hereinafter described.

In the drawings, Figure 1 is a central vertical section of the device. Fig. 2 is a cross-section in line *x x* of Fig. 1.

A indicates the receptacle, which is preferably made of glass, but may be made of any other suitable material. This receptacle has a closed top, *a;* but the bottom is entirely open.

B is a plunger or piston that slides up and down in the receptacle, being provided with a packing, *b*, that rests against the sides of the receptacle and makes a tight joint. C is a piston-rod attached to the plunger and extending up through a packing-box, *c*, at the top of the receptacle and provided with a cross head, *d*, at the top, by which it is operated. By this means the plunger can be moved up and down.

D is a stop-cock and discharge-spout at the top of the receptacle, through which the liquid is received from the supply and by which it is discharged for use, and E is a vent on the opposite side of the receptacle, to allow the entrance of air as the liquid is discharged. This vent may or may not be used, as the liquid can be discharged without it by simply drawing up the plunger.

To charge the receptacle the stop-cock D is closed and the plunger B is moved from the top down to the bottom of the receptacle, which exhausts the air. A tube leading from the supply tank or cask is then attached to the discharge-spout and the cock is opened, allowing the receptacle to be filled with the liquid. The stop-cock is then closed and the beer is confined air-tight and retains all its gases, and can be carried any distance, retaining all its good qualities.

To discharge the liquid for use, the stop-cock is opened and the plunger is drawn up; or, in case the vent is used, as before described, it is opened, which allows the air to enter as fast as the liquid is poured off.

This invention is of great advantage where it is desired to carry small quantities of beer a limited distance for use and preserve all its lively qualities.

G is an open-topped annular ice-chamber surrounding the receptacle and forming a part of it. Broken ice is placed in this chamber surrounding the receptacle, serving to keep the liquid cool.

Having described my invention, what I claim as new, and desire to secure by Letters Patent, is—

The combination of the receptacle having a closed top and open bottom and provided with a stop-cock and discharge-spout, and a plunger resting in the receptacle, worked by a handle on the outside of the receptacle, the whole arranged to operate in the manner and for the purpose specified.

In witness whereof I have hereunto signed my name in the presence of two subscribing witnesses.

LAWRENCE FEELY.

Witnesses:
ALEXANDER J. SMITH,
R. F. OSGOOD.